(12) United States Patent
Meriaux et al.

(10) Patent No.: US 11,593,499 B1
(45) Date of Patent: *Feb. 28, 2023

(54) RECORD RELATIONSHIP CHANGE CONTROL IN A CONTENT MANAGEMENT SYSTEM

(71) Applicant: Veeva Systems Inc., Pleasanton, CA (US)

(72) Inventors: Jean-Christophe Meriaux, Concord, CA (US); Peter Thorson, Danville, CA (US); Adam McMillan, Dublin, CA (US)

(73) Assignee: Veeva Systems Inc., Pleasanton, CA (US)

(*) Notice: Subject to any disclaimer, the term of this patent is extended or adjusted under 35 U.S.C. 154(b) by 295 days.

This patent is subject to a terminal disclaimer.

(21) Appl. No.: 17/086,238

(22) Filed: Oct. 30, 2020

Related U.S. Application Data

(63) Continuation of application No. 16/033,108, filed on Jul. 11, 2018, now Pat. No. 10,878,115.

(51) Int. Cl.
*H04L 29/06* (2006.01)
*G06F 21/62* (2013.01)
*G06F 16/28* (2019.01)
*H04L 9/08* (2006.01)

(52) U.S. Cl.
CPC ........ *G06F 21/6218* (2013.01); *G06F 16/288* (2019.01); *H04L 9/085* (2013.01); *H04L 9/088* (2013.01)

(58) Field of Classification Search
CPC ....... H04L 63/20; H04L 63/108; H04L 9/085; H04L 9/088; G06F 21/6218; G06F 16/288
USPC .......................................................... 726/28
See application file for complete search history.

(56) References Cited

U.S. PATENT DOCUMENTS

| | | | |
|---|---|---|---|
| 7,715,557 B2* | 5/2010 | Duval | H04N 7/163 725/31 |
| 9,871,796 B1* | 1/2018 | Sowa | H04L 67/30 |
| 2007/0260476 A1‡ | 11/2007 | Smolen | G06F 16/2308 705/1.1 |
| 2007/0260621 A1* | 11/2007 | Smolen | G06F 16/2308 |

\* cited by examiner
‡ imported from a related application

*Primary Examiner* — Longbit Chai

(57) ABSTRACT

Systems and methods for controlling record relationship changes in a content management system. The content management system may have several layers of access controls, which may include a layer of access control at the object level, a layer of access control at the row level and a layer of access control at the field level. Access may be controlled at the object level by a user's security profile, at the object record level (or row level) by the user's role, and/or at the object field level by the user's role or a state in a document lifecycle. A secure inbound relationship attribute may be used to control record relationship changes. Actions for creating, deleting and reassigning are permitted only when the inbound relationship is editable according to the secure inbound relationship attribute.

16 Claims, 20 Drawing Sheets

| Name | User | Role | Doc Type | Product | Country |
|---|---|---|---|---|---|
| DAC 001 | John Smith | Reviewer | Digital | Coldcap | USA |
| DAC 002 | Joan White | Owner | | Restalot | Canada |

FIG. 4

| User Setup Records Fields | | Document Fields | |
|---|---|---|---|
| 501 | My Product | Product | 503 |
| 502 | Country | Country | 504 |

FIG. 5

Step 3: Set the options

Status [Active]

Object* [Quality Event ▼]

☐ Allow create new reference record
☐ User must always enter a value (required)
☐ Values must be unique
☐ Display in default lists and hovercards
☐ Do not copy this field in Copy Record
☐ Secure relationship ⓘ — Relationship security is configured on the referenced object's lifestyle state details page
Learn more Set Default Value Help Content

FIG. 11

▼ Batches

| + Add | | 🔍 Show in Tab | | | 1-2 of 2 ⚙▼ |
|---|---|---|---|---|---|
| Context ID ▲ | Context Type | | Product | Manufacture Date | Expiration Date |
| BAT-CC-101 | Batch | | Choicecap | 4/1/2017 | 6/30/2018 |
| BAT-CC-102 | Edit ✏ Edit 🗑 Remove ⊙ Audit Trail | VIEW | Choicecap | 4/1/2017 | 4/30/2018 |

1401 ⟶ Add

1402 ⟶ (popup menu)

▲ Assets

▲ Material

Root Causes ▶
Create Root Cause

▼ Details

Name*

Cause Type*  | Root Cause ▼ |
Cause Category* | Equipment Problem ▶ |
Cause Detail* | Human-Machine Interface Error ▶ |
Quality Event* | QE-000010 ⊗ |
You do not have permission to select this value.

▼ Additional Details

Created Date
Last Modified Date

Created By
Last Modified By
Lifecycle State*

Details
Additional Details

Cancel    Save + Create    ✓ Save

FIG. 15B

| Root Causes | | | |
|---|---|---|---|
| Name ▲ | Cause Category | Cause Detail | Cause Type | Quality Event |
| RC-000001 | Equipment Problem | Tolerable Failure | Root Cause | QE-000001 |
| RC-000002 | Personnel Error | Technical Error | Root Cause | QE-000001 |
| RC-000012 | Procedural Problem | No Preventative Maintenance | Root Cause | QE-000004 |
| RC-000013 | Equipment Problem | No Preventative Maintenance | Root Cause | QE-000005 |
| RC-000014 | Equipment Problem | Human-Machine Interface Error | Root Cause | QE-000010 |
| RC-000015 | Equipment Problem | System Deficiency | Root Cause | QE-000009 |
| RC-000017 | Procedural Problem | Preventative Maintenance - Needs Improvement | Root Cause | QE-000012 |

▼ Documents

[+ Add]  [🔍          ] Show in Library 1-20 of 616   ◄ [1] ► of 31

| Name ▼ | Document Number | Type | Subtype | Classification |
|---|---|---|---|---|
| 22915 Acceptance of Investigator... | VV-TMF-01211 | Site Management | Site Set-up | Acceptance of Investigator |
| 22915 Additional Monitoring Activity | VV-TMF-01194 | Site Management | Site Management | Additional Monitoring Activi |
| 22915 Advertisements for Subject... | VV-TMF-01214 | Central Trial Documents | Subject Documentation | Advertisements for Subject |
| 22915 Certification or Accreditation | VV-TMF-01245 | Central and Local Testing | Facility Documentation | Certification or Accreditation |

FIG. 17

▼ Documents to be Released

| + Add | | | | |
|---|---|---|---|---|
| | | | | 1-1 of 1 |
| Name ▼ | Document Number | Status | Proposed Effective Date | Training |
| Signature doc-2 | VV-QUAL-00033 | DDC Approved, Pending Release | 5/12/2017 | Training |

▼ Documents to be made Obsolete

| + Add | | | | |
|---|---|---|---|---|
| | | | | 1-1 of 1 |
| Name ▼ | Document Number | Status | Obsolescence Approved | Proposed |
| Document to withdraw obsolete | VV-QUAL-00008 | Effective | Yes | 5/12/2017 |

FIG. 18

RECORD RELATIONSHIP CHANGE CONTROL IN A CONTENT MANAGEMENT SYSTEM

BACKGROUND

The subject technology relates generally to content management, and more particularly to controlling record relationship changes in enterprise content management.

Users increasingly depend on content management systems because of their ubiquitous and managed access, from anywhere, at any time, from any device. However, because of the large volume of documents in content management systems, large number of users, and their different permissions to access the documents, managing record relationship changes has been a massive and very time-consuming operation.

SUMMARY

The disclosed subject matter relates to a method for controlling relationship changes between records in a content management system, wherein the content management system stores a first record and a second record and wherein each of the records is associated with a set of attributes. The method comprises: displaying a first user interface; and receiving on the first user interface a first set of access control configuration information for a first user based on a first layer of access control of the content management system, wherein the first set of access control configuration information comprises a first type of access permission. The method further comprises: displaying a second user interface; and receiving on the second user interface a second set of access control configuration information for the first user based on a second layer of access control of the content management system, wherein the second set of access control configuration information comprises a second type of access permission. The method further comprises: displaying a third user interface; and receiving secure inbound relationship configuration information on the third user interface, wherein the secure inbound relationship configuration information comprises a secure inbound relationship attribute, wherein the first record is a master record and the second record is a detail record, wherein the second record references the first record, wherein the first record and the second record have a pre-determined record-to-record relationship, and wherein the pre-determined record-to-record relationship is secured when the secure inbound relationship attribute is turned on. The method further comprises: determining if the inbound relationship is editable according to the secure inbound relationship attribute, the first record's condition, and the first type of access permission.

BRIEF DESCRIPTION OF THE DRAWINGS

FIG. 4 illustrates an example user interface for receiving user setup records according to one embodiment of the present invention.

FIG. 5 illustrates an example user interface for receiving a matching rule definition according to one embodiment of the present invention.

FIG. 11 illustrates an example user interface for configuring secure inbound relationship attribute according to one embodiment of the present invention.

FIG. 14 illustrates an example user interface for permitted actions based on the secure inbound relationship attribute according to one embodiment of the present invention.

FIG. 15A illustrates an example user interface for selecting actions on records according to one embodiment of the present invention.

FIG. 15B illustrates an example user interface for displaying an error message when a selected action on records is not permitted according to one embodiment of the present invention.

FIG. 16 illustrates an example user interface for permitted actions based on the secure inbound relationship attribute according to one embodiment of the present invention.

FIG. 17 illustrates an example user interface for permitted actions based on the secure inbound relationship attribute according to one embodiment of the present invention.

FIG. 18 illustrates an example user interface for permitted actions based on the secure inbound relationship attribute according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
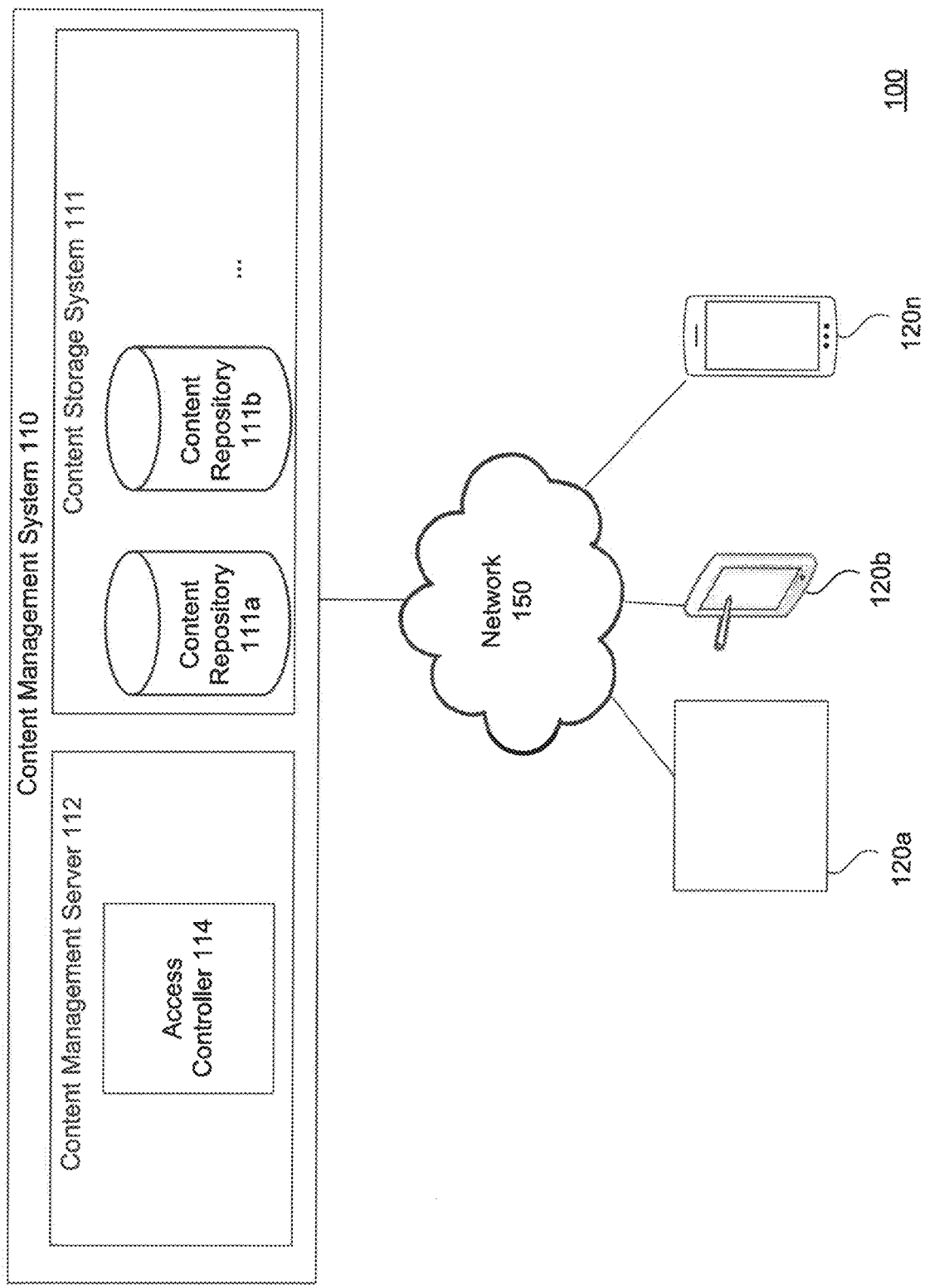
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120a, 120b, . . . 120n, coupled to each other via a network 150. The content management system 110 may include a content storage system 111 and a content management server 112. The content storage system 111 may have one or more content repositories, e.g., 111a and 111b. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a -120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120a-120n may access. Each content repository (e.g., 111a or 111b) may store a specific category of content, and allow users to interact with its content in a specific business context.

The content management server 112 is typically a remote computer system accessible over a remote or local network, such as the network 150. In one implementation, the content management server 112 may have an access controller 114 which may control the process for setting up user roles, generating user groups, matching user groups and documents, stamping user groups on matching documents, and enabling state or role based field level overrides, as will be described in detail below.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
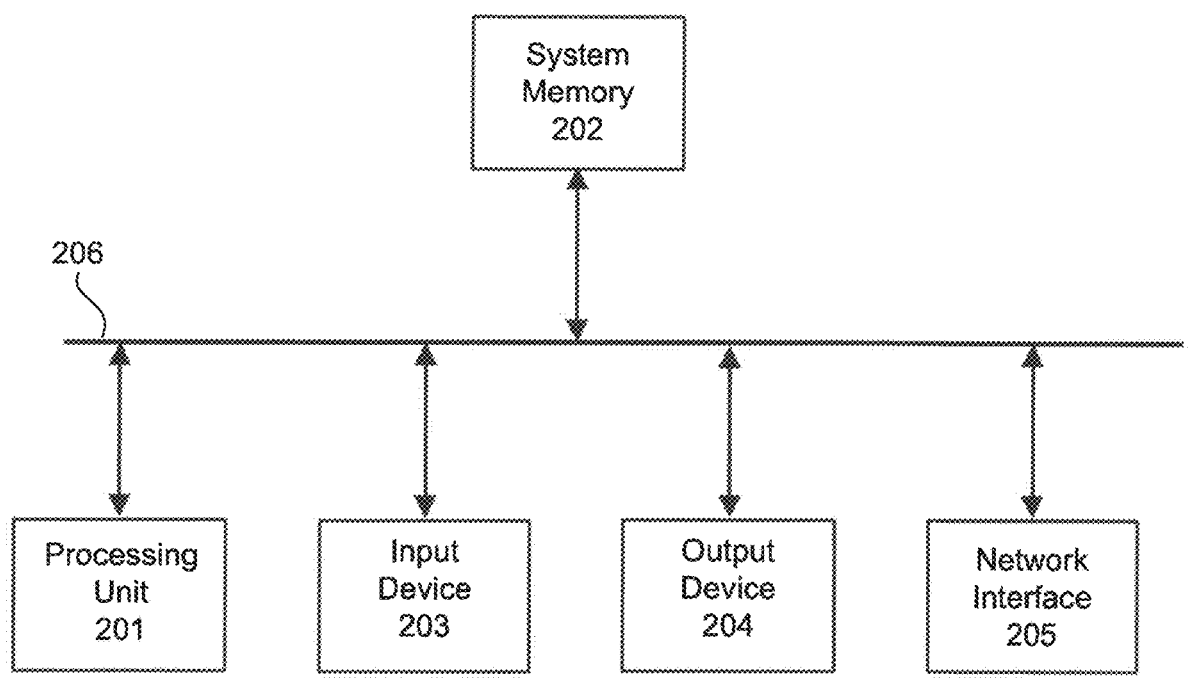
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
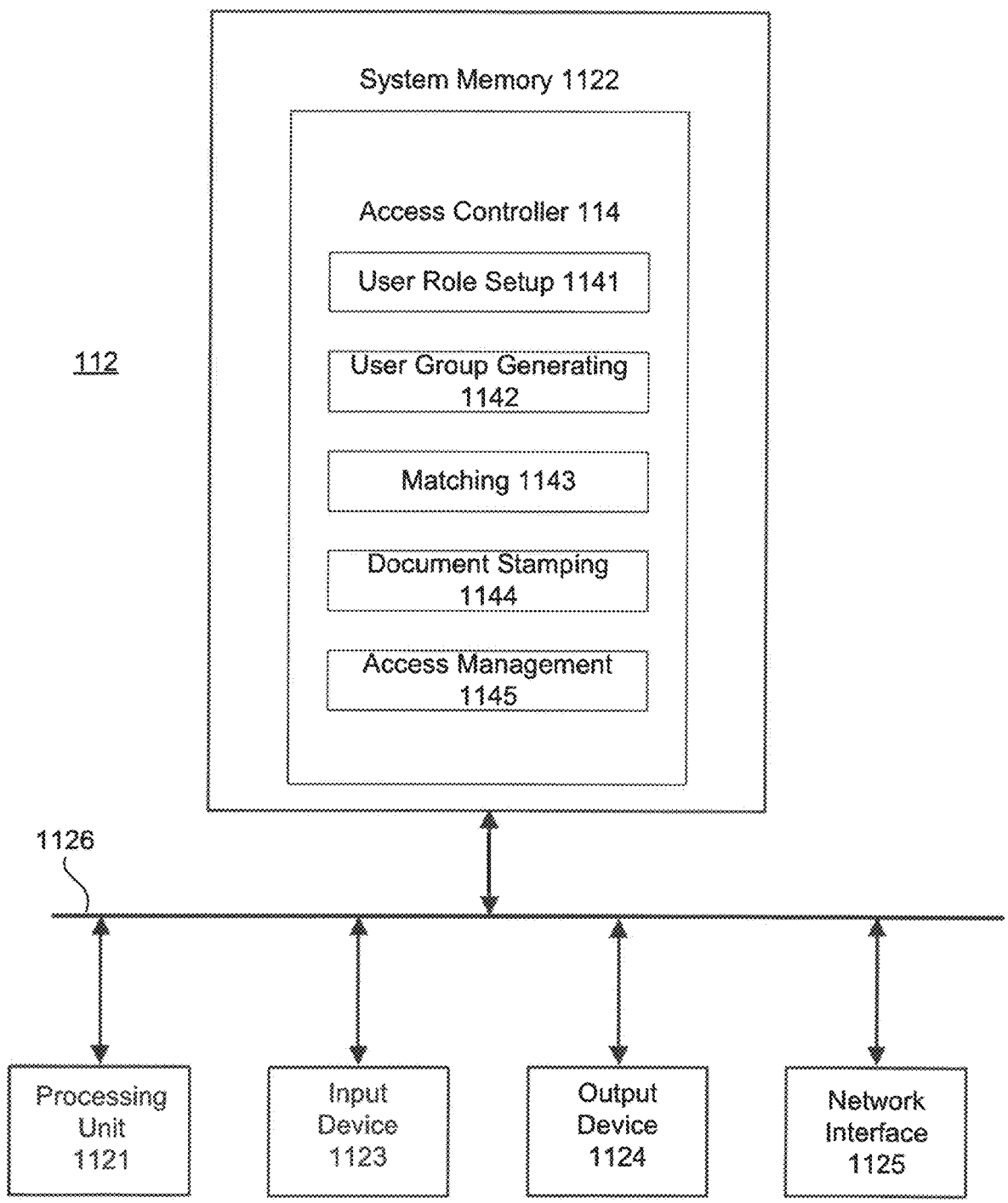
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The access controller 114 may include a user role setup module 1141, a user group generating module 1142, a matching module 1143, a document stamping module 1144, and an access management module 1145.

An enterprise may subscribe the content management service as a customer. Users may play different roles when accessing documents, e.g., owner and reviewer. The user role setup module 1141 may define one or more roles a user may play as to document access in an enterprise. In one implementation, user setup records may be used to define the roles. As shown in FIG. 4, the user setup records may be included in a table, and each user setup record may have one or more fields. The fields may define the user's access permissions based on his/her responsibilities and/or skill-sets, and may include role, product, country, document type and other attributes.

A customer's system administrator may define what role(s) a user may play, assign users or employees different roles, and manage the roles with the user setup records. A system administrator may use attributes in fields of the user setup records to group users depending on its business need. The system administrator may select default fields and/or attributes provided by the content management system 110, or add new fields and/or attributes to customize user roles. In one example, one user setup record may define a user as a reviewer, who is familiar with a product Coldcap and a country Canada.

As users join the enterprise, move within the enterprise or leave the enterprise, the system administrator may add, modify or delete user setup records which define what kind of roles the users play. The system administrator may select a default role provided by the system, or create a new role. The user role setup module 1141 may display a user interface 400 shown in FIG. 4 to receive input from the system administrator, and process and store the information.

With the user setup records received from the customer's system administrator, the user group generating module 1142 may automatically generate user groups based on different combinations of attributes in the records. The groups may be, e.g., a Coldcap USA reviewer group for users who can review documents related to Coldcap in the U.S, and a Restalot Canada editor group for users who can edit documents related to Restalot in Canada.

Users may be assigned to appropriate user groups based on attributes of their user setup records. For example, if a user setup record is received via the user role setup module 1141 for a user who can review documents related to Coldcap in the U.S., that user may be automatically assigned to the Coldcap USA reviewer group. When a record is modified or deleted and does not have attributes associated with a user group anymore, that user may be pulled out of that user group. Access to documents may be defined for each user group based on attributes associated with the user group and applied to all users in the group.

Documents may also have a number of attributes, which may include document ID, product (e.g., Coldcap and Restalot) and country. A document attribute can either be single valued (i.e., for a single product or a single country), or multi-valued (i.e., for multiple products, or in different countries). The system administrator may then define a matching rule which may define how to match the user groups to the documents. The matching module 1143 may match user groups to appropriate documents with the matching rule.

In one implementation, the matching module 1143 may compare attributes associated with the user group (i.e., relevant attributes of user setup records in a user group) and the corresponding attributes of a document, e.g., product to product, and country to country. As shown in FIG. 5, a user interface 500 may display one or more fields of user setup objects, and allow the system administrator to select the matchable document field(s), or vice versa. In one implementation, when the system administrator clicks on a window 503 to select a matchable field for the My Product field in a window 501, a drop-down or pop-up window including a list of fields may be displayed for the system administrator to select. In one example, the matchable fields are selected based on their names. If their names are matchable, then the fields are matchable. In one example, the matching module 1143 may display fields of user setup objects and those of document, and line up matchable fields even when the names are not exactly the same, e.g., My Product in user setup object and Product in document attributes. This may allow the system administrator to match the fields up.

In one implementation, the matching rule may define the number of field(s) to match. Some users may play roles for all products in one country, then only the country needs to be matched, not the product. Some users may play roles in all countries, but only some products, then the matching rule needs to be defined only based on products. For some users, it may be both.

The document stamping module 1144 may stamp a group to a document when they are matchable. For example, if Document 1's fields indicate that it is related to Coldcap in the U.S., the Coldcap US reviewer group may be stamped to it. In one implementation, a document field may be used to identify user groups having access right to the document for the document stamping.

When an existing rule is changed, some of the old document stamps may become obsolete because they are based on the old rule. The matching module 1143 may determine which old document stamps are based on the old rule, check all the groups related to the old rule and all the documents, and try to match them. The document stamping module 1144 may then stamp the documents with their new matchable groups. Events that may trigger document stamping from rule change may include adding and updating a matching rule, changing the status of a matching rule (e.g., activate and deactivate) and removing a matching rule.

The matching module 1143 may interpret the rules at setup time and the document stamping module 1144 may stamp the user groups to the documents at setup time as well. Once it is done, at the run time, when a user searches the documents, the access controller 114 may know immediately what kind of role he/she may play on what document without further interpretation of the rules. The present invention evaluates the rules when they are created, modified, deleted, or when the documents are created and updated.

Figure 6A:
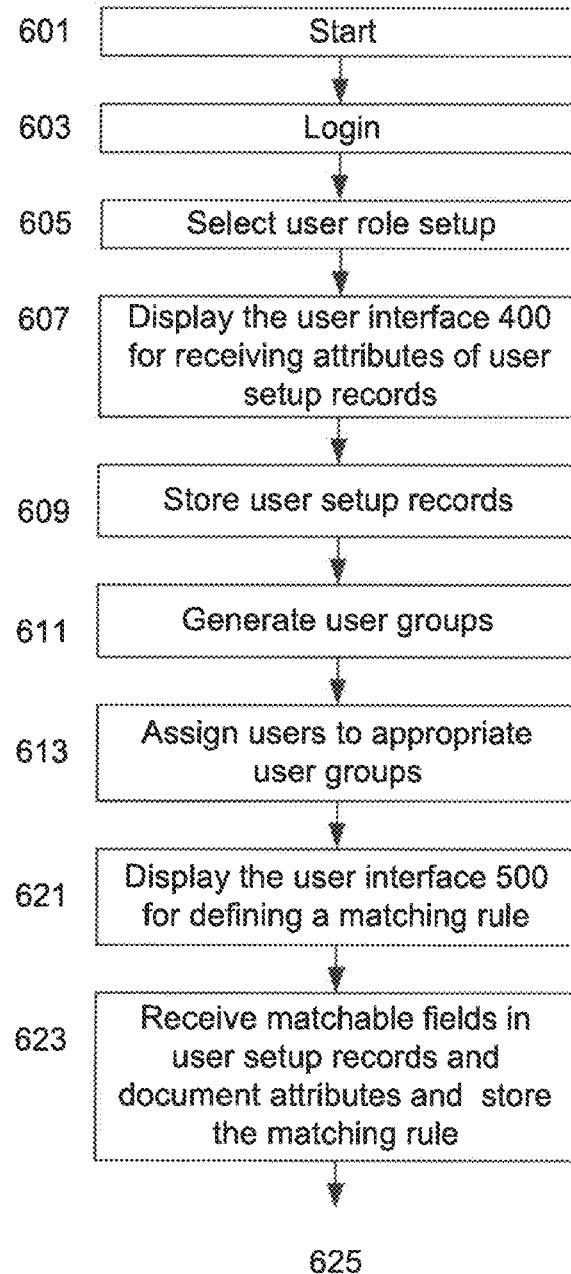
FIG. 6A and 6B illustrate an example flowchart of a method for configuring the access controller according to one embodiment of the present invention.
Figure 6B:
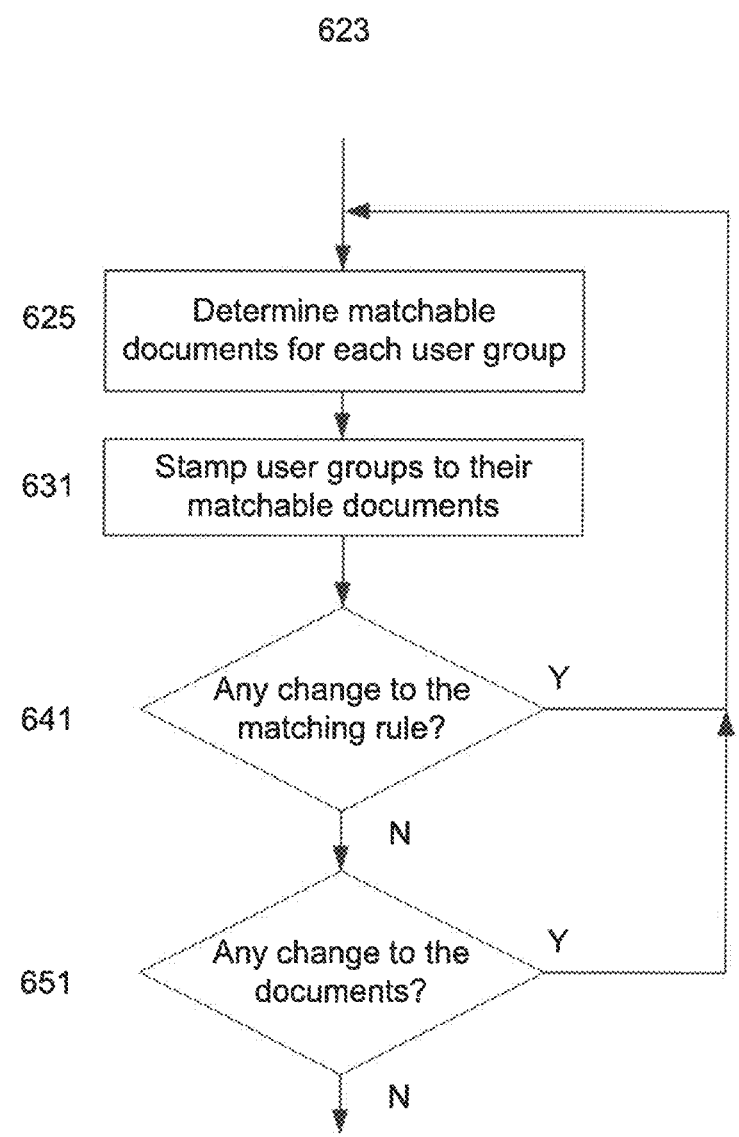

FIGS. 6A and 6B illustrate an example flowchart of a method for configuring the access controller 114 according to one embodiment of the present invention. The method may start at 601.

At 603, a system administrator may login to the content management system 110.

At 605, the system administrator may select user role setup.

At 607, the user interface 400, as show in FIG. 4, may be displayed for the system administrator to input attributes of user setup records.

At 609, the user setup records may be received and stored, e.g., in the system memory 1122.

At 611, the user group generating module 1142 may check the user setup records, and generate user groups based on different combinations of attributes of the records. In one example, the user setup records may include a product field (e.g., Coldcap and Restalot), a country field (e.g., USA and Canada) and a role field (e.g., reviewer and owner). A user group may be generated for each different combination of attributes in these three fields based on user setup records. Consequently, eight groups may be generated, which may include reviewers of documents related to Coldcap in USA, reviewers of documents related to Coldcap in Canada, owners of documents related to Coldcap in USA, owners of documents related to Coldcap in Canada, reviewers of documents related to Restalot in USA, reviewers of documents related to Restalot in Canada, owners of documents related to Restalot in USA and owners of documents related to Restalot in Canada.

At 613, users may be assigned to the user groups based on attributes of their user setup records. In one example, when a user setup record indicates that the user is a reviewer of documents related to Coldcap in the U.S., he may be assigned to the Coldcap USA reviewer group.

At 621, a user interface 500, as shown in FIG. 5, may be displayed for the system administrator to define the matching rule.

At 623, matchable fields of user setup records in a user group and document attributes may be received on the user interface 500 and the matching rule may be stored in the system memory 1122.

At 625, matchable documents for each user group may be determined based on attributes of user setup records in the user group, the matching rule, and attributes of the documents.

At 631, the user groups may be stamped to their matchable documents so that users in that group can access the matchable documents.

At 641, it may be determined if there is any change to the matching rule, which may be updating the matching rule, activating/deactivating the matching rule, or adding a new matching rule. If yes, the process may return to 625 to match the user groups and documents according to the rule change.

At 651, it may be determined if there is any change to the document attributes. If yes, the process may return to 625 to match the groups and documents according to the updated document attributes.

Figure 7:
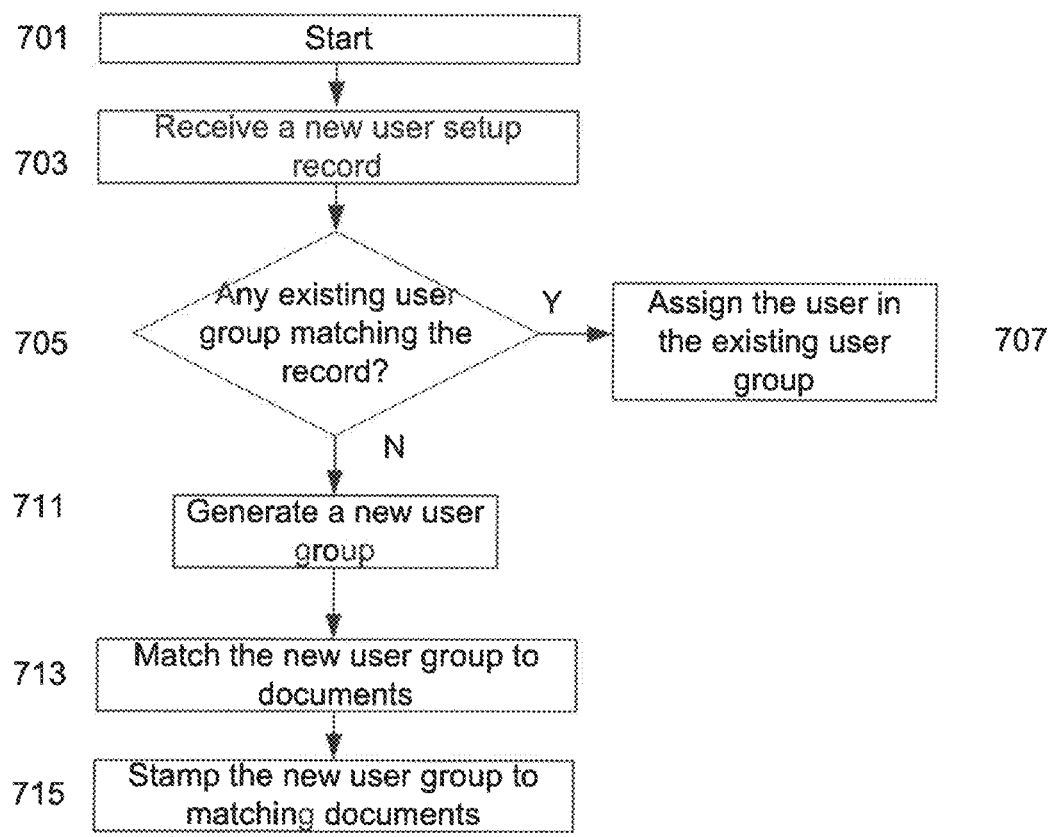
FIG. 7 illustrates an example flowchart of a method for controlling document/object access in a content management system according to one embodiment of the present invention.

FIG. 7 illustrates a flowchart of a method for controlling document access according to one embodiment of the present invention. The process may start at 701.

At 703, a new user setup record may be received via the user role setup module 1141 when a new user joins the enterprise or the role of an existing user changes.

At 705, the user group generating module 1142 may compare attributes of the new user setup record and attributes associated with each existing user groups and determine if any existing user group matches the new user setup record.

If yes, at 707, the user may be assigned to the existing user group that matches the new user setup record. The user may get access to all documents to which the existing user group is stamped.

If no existing user group matches the new user setup record, a new user group may be generated at 711.

At 713, the matching module 1143 may match the new user group to the documents.

At 715, the new user group may be stamped to matchable documents, so that the user may access the stamped documents.

Figure 8:
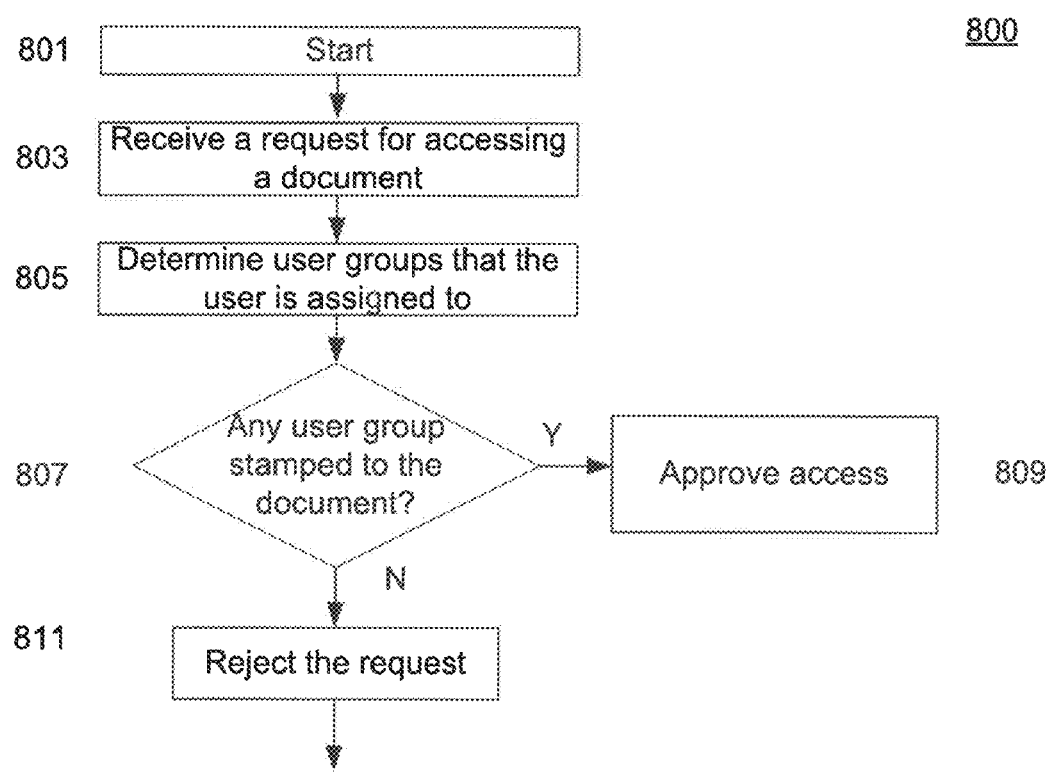
FIG. 8 illustrates an example flowchart of a method for controlling document/object access in a content management system according to one embodiment of the present invention.

FIG. 8 illustrates a flowchart of a method for controlling document/object access according to one embodiment of the present invention. The process may start at 801.

At 803, a request for accessing a document may be received from a user.

At 805, it may be determined, e.g., by the access management module 1145 in the content management server 112, the groups that the user is assigned to.

At 807, it may be determined, e.g., by the access management module 1145, if any of the groups that the user is assigned to is stamped to the document.

If yes, at 809, access to the document may be approved. Otherwise, at 811, the request may be rejected.

In one implementation, a content management system may have several layers of access controls, which may include a layer of access control at the object level, a layer of access control at the row/record level and a layer of access control at the field level. Access may be controlled at the object level by a user's security profile, at the object record level (or row level) by the user's role, and/or at the object field level by the user's role or a state in a document lifecycle. In other words, the object level access control may grant access (e.g., Create, Read, Edit and Delete) on objects, the object record level access control may grant access (e.g., Read, Edit and Delete) on object records, and field level access control may grant access (e.g., Read, Edit and Hidden) on object field level.

The role based object record level or row level security is described above with reference to FIGS. 4-8.

State/role field level access control may provide another layer of control, allowing an organization to dictate which users can view or edit a specific field on an object record. For state/role field level security, access to objects (or documents) may be further configured by field when a user is in a certain role on the object (or document), and/or an object (or document) is in a certain state in its lifecycle. The state/role field level security may be set within an object/document lifecycle including a number of states (e.g., draft, baseline, planned and complete in Table 1), and applied to all roles in that state. A customer's system administrator may have the ability to override security settings by role for a given state and/or given object/document field. The state/role field level security may control which fields are in Read mode, or Edit mode and which fields are Hidden. For example, the state/role field level security may make object fields read-only as an object record progresses in lifecycle states, enable collaborative flows where certain user roles can edit fields only in certain states, and hide fields which are irrelevant in entry states (e.g., actual start/end dates hidden in the planning state).

With the state/role field level security, for each state of an object record and by object field, one of the following settings may be applied:

1. "Hide": the field is hidden in Forms (UI/API), and the field is populated with a visual indicator specifying the field is hidden in a list view (UI/API);
2. "Read": the field is made read-only in the state (even if editable or read-only at object/profile level) in UI/APIs; and
3. "Edit": the field is in Edit mode (assuming the record is in the Edit mode).

Table 1 shows an example of state/role field level security configuration for a milestone object:

TABLE 1

| STATE OBJECT FIELDS | DRAFT | BASEDLINE | PLANNED | COMPLETE |
|---|---|---|---|---|
| Actual Start | Hidden | Hidden | Edit | Read |
| Actual Finish | Hidden | Hidden | Edit | Read |
| Baseline Start | Read | Read | Read | Read |
| Baseline Finish | Read | Read | Read | Read |
| Milestone Template | Read | Read | Read | Read |
| Name | Edit | Read | Read | Read |
| Forecasted Start | Edit | Edit | Edit | Read |
| Forecasted Finish | Edit | Edit | Edit | Read |

In one implementation, the object level security may be restricted by the record/row level security, and the record/row level security may be further restricted by the state/role field level access control. The lower level security may restrict its upper level security, but may not expand its upper level security.

The state/role field level security may be used to override specific fields on specific roles, using the same settings (Hide, Read, Edit).

The overrides may happen at the role level. In one example, for a study manager role, the object fields "Baseline Start" and "Baseline Finish" may be changed from "Read" to "Edit" in draft state assuming the upper level security permits that. In one example, for a data administrator, all of the fields may be changed to "Edit" in draft state.

In one implementation, a user may be assigned to multiple roles on the same record. In this scenario, the user may be granted the union of all access credentials. For instance, in the example above, if a user is assigned as a "Study Manager" and a "Data Administrator" on the same record, then this user will be able to "Edit" all fields in draft state.

Hiding a field with state/role field level security is a way to avoid accidental exposure of the field values at certain stage of the object lifecycle, for example, when fields are overall not needed/relevant in specific states of an object record, or the field values are not needed to complete their tasks for some users (roles) in certain states.

In one implementation, row level security may grant document/object record access to users based on their roles. State/role field level security may restrict access granted under role level security in certain settings on certain fields.

Tables 2, 3, and 4 show examples of the permissions, overrides and the results.

TABLE 2

Field: Baseline Start date; State: Draft

|  | Read | Edit |
|---|---|---|
| Object Level | v | v |
| Object Record | v | v |
| State/role Field Level Security | Read | |
| Resulting Permissions on the field | Read: Yes (Field is read-only for this filed and this record) | Edit: No |

As shown, the state/role field level security restricts the access to Read only, although the object level security and object record security include Edit.

TABLE 3

Field: Baseline Start Date; State: Draft

|  | Read | Edit |
|---|---|---|
| Object Level Security | v | v |
| Object Record Level Security | v | v |
| State/Role Based Field Level Security | Read by default on state. Override: Edit for the role "Study Administrator" | |
| Resulting Permissions on Field | Read for users other than Study Administrator: Yes (Field is read-only for this field and this record) | Edit: Yes for Study Administrator only |

As shown, state based field level security added Edit permission.

TABLE 4

Field: Actual State Date; State: Draft

|  | Read | Edit |
|---|---|---|
| Object Level Security | v | v |
| Object Record Level Security | v | |
| State/role Field Level Security | Hidden by default on state, and no role override | |
| Resulting Permissions | Read: No | Edit: No |

As shown, state based field level security override hides the field for this state and record.

Figure 9:
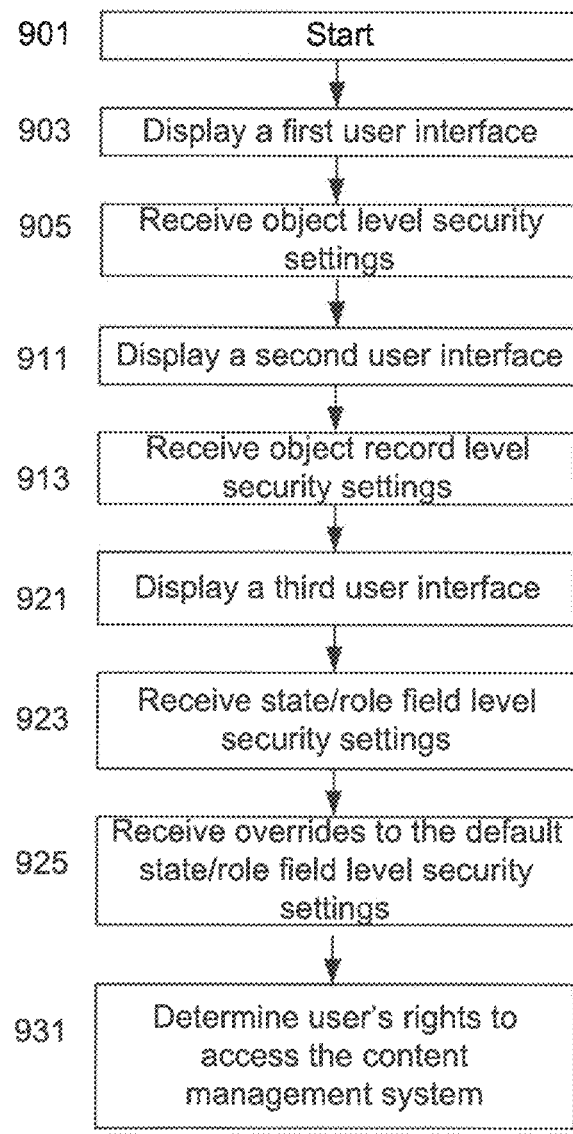
FIG. 9 illustrates a flowchart of a method for controlling document/object access according to one embodiment of the present invention.

FIG. 9 illustrates a flowchart of a method for controlling document/object access according to one embodiment of the present invention. The process may start at 901.

At 903, a first user interface may be displayed for receiving settings for a first user according to the first layer of access control. In one implementation, the first layer of access control may be object level access control, and may grant the first user rights to access the objects/documents in the content management system (e.g., Create, Read, Edit and Delete) based on the first user's security profile.

At 905, settings for the first user according to the first layer of access control may be received on a first user interface. As an example, the first user, a study manager, has the Read and Edit permissions on the object and all its fields.

At 911, a second user interface may be displayed for receiving settings for the first user according to the second layer of access control. In one implementation, the second layer of access control may be object record level access control, and may grant the first user rights to access objects and documents in the content management system (e.g., Read, Edit and Delete) based on the first user's role in the object/document lifecycle.

At 913, settings for the first user according to the second layer of access control may be received on the second user interface. In one example, a new user setup record may be received via the user role setup module 1141 when a new user joins the enterprise or the role of an existing user changes. For example, the first user has Read and Edit access only on studies in a certain country based his role.

At 921, a third user interface may be displayed for receiving settings for the first user according to the third layer of access control. In one implementation, the third layer of access control may be field level, and may grant the first user rights to access objects/documents in the content management system (e.g., Read, Edit and Hidden) based on the first user's role and/or state in the document lifecycle.

At 923, settings for the first user according to the third layer of access control may be received on the third user interface. In one implementation, the settings for the first user according to the third layer of access control may be default settings for the field level access control. In one implementation, settings for the first user according to the second layer of access control may be used as the default settings for the field level access control. In one example, by default, for all users, the field Start Date may be Read-only when the study is in the state "in progress".

At 925, an override to the default settings for the state/role field level access control may be received. The override may allow an administrator to change a user's permission to access a document at a certain state. The override may be defined by the role. For example, for a second user, e.g., a data administrator, the field Start Date may be changed to Edit in the state "in progress". The override may make the user's permission broader than the default settings, but it can't exceed the permissions defined at the object level and object record level securities.

At 931, the first user's rights to access may be determined based on the settings according to the first, second and third layer (including the default and the override) of access control, as explained with reference to Tables 2-4.

Master and detail object records (or documents) have an established record-to-record relationship, as the detail record references the master record, e.g., in an object reference field. The record-to-record relationships may include any type of relationships, not only parent-child.

There is a need to control when the CREATE and/or DELETE action is available for any of the related object records. For instance, when a Deviation Object record is in a "Closed" lifecycle state, it should not be allowed to create Assets-Deviation or Batch-Deviation related object records.

In addition, business applications often require that related object records are considered functionally part of the master object record, such as compliance to business processes and data integrity. As an example, in Quality Process Management ("QMS"), a user should not be allowed to add related records to a Closed Deviation—as the related records are considered as being part of the Deviation from a user's standpoint. Based on the state and roles assigned to the master record, it is desirable to be able to enable or disable relationship changes between the master and the detail record. The present invention allows configuration of such business rules in an easy way.

The present invention provides a method to restrict related record creation, deletion and reassignment when a master object record is in a specific lifecycle state, and is for certain user roles. It controls when a detail object record (or document) can be assigned or unassigned to a master object record, based on the master record state and roles. As an example, if a Quality Event (QMS) is in "Action" state, it should not be allowed to assign new root causes, delete root causes associated with the event, or reassign another root cause to the quality event.

A many-to-many relationship lets users create dependencies between multiple records on two different objects, using a third, relational object with two parent objects. This relational object can be simple, meaning it only has the standard fields (e.g., Label) and parent object fields. Relational objects can also be complex, meaning they have additional custom fields.

In one implementation, when a relationship has a READ permission on the relationship for a specific state (and or role) of a master record, the following rules may apply:
1) For simple relationships, new records cannot be created, and existing records cannot be deleted.
2) For child objects, new records cannot be created, or existing records cannot be deleted.
3) For complex relationships, new records cannot be created, and existing records cannot be deleted.
4) For object references, new records cannot be created or existing records cannot be deleted, and records cannot be assigned or re-assigned to a new master record.

These business rules need to be applied across all touchpoints, including UIs, and APIs.

For inbound relationships, in a parent-child relationship, the object the user is viewing is the parent; and in a reference relationship, another object references the object the user is viewing. For outbound relationships, in a parent-child relationship, the object the user is viewing is the child; and in a reference relationship, the object the user is viewing references another object.

Each inbound relationship of a master object can be configured to be secured using a secure inbound relationship attribute. For this purpose, object reference fields on the related object records can be configured to honor the "Created Related Records" permission for the corresponding object relationship.

In one implementation, each inbound relationship of an object (or document) has a "Secure inbound relationship" flag. When enabled, the relationship security can be configured by lifecycle state of the master object.

In one embodiment, configuration by state and role may be done as follows:
1) Each secured inbound relationship can be assigned an EDIT (Default) or READ permission at the State Level;
2) Users have the ability to override state default by role; and
3) At runtime, relationship security may apply on top of other settings, e.g., profile level, and row level.

When the inbound relationship has a READ permission only for the states/roles of the master object record, the following scenarios are prevented in UIs and APIs:
1) a new detail record (or document) referencing the master record should not be created;
2) a detail record (or document) referencing the master record should not be deleted;
3) an existing detail record (or document) of the master record should not be reassigned to another master record (reference another parent or making the reference null); and
4) an existing detail record (or document) should not be reassigned to the master record.

Conversely, when the inbound relationship has an EDIT permission for the master record, and with the right security settings (row level, and profile level), the scenarios above are allowed in the UIs/APIs.

When either creating, editing or deleting an object record or document, outbound relationships should honor security settings configured on the master object lifecycle states (UIs/APIs).

In the user interface, and when viewing a master object record, the UI may enforce the following:
1) For simple join object (or related documents): add and remove record actions are displayed based on security settings.
2) For object reference and complex join: create and delete record actions are displayed based on security settings.
3) For related documents: add and remove documents in the related document sections (object details) are displayed based on security settings.

When editing a detail record outside of the context of a master record, updates on object reference records should honor the relationship security. The object reference field is read-only when the relationship has the READ permission only, and an exception is displayed on invalid object reference update.

APIs should enforce relationship security.

Figure 10:
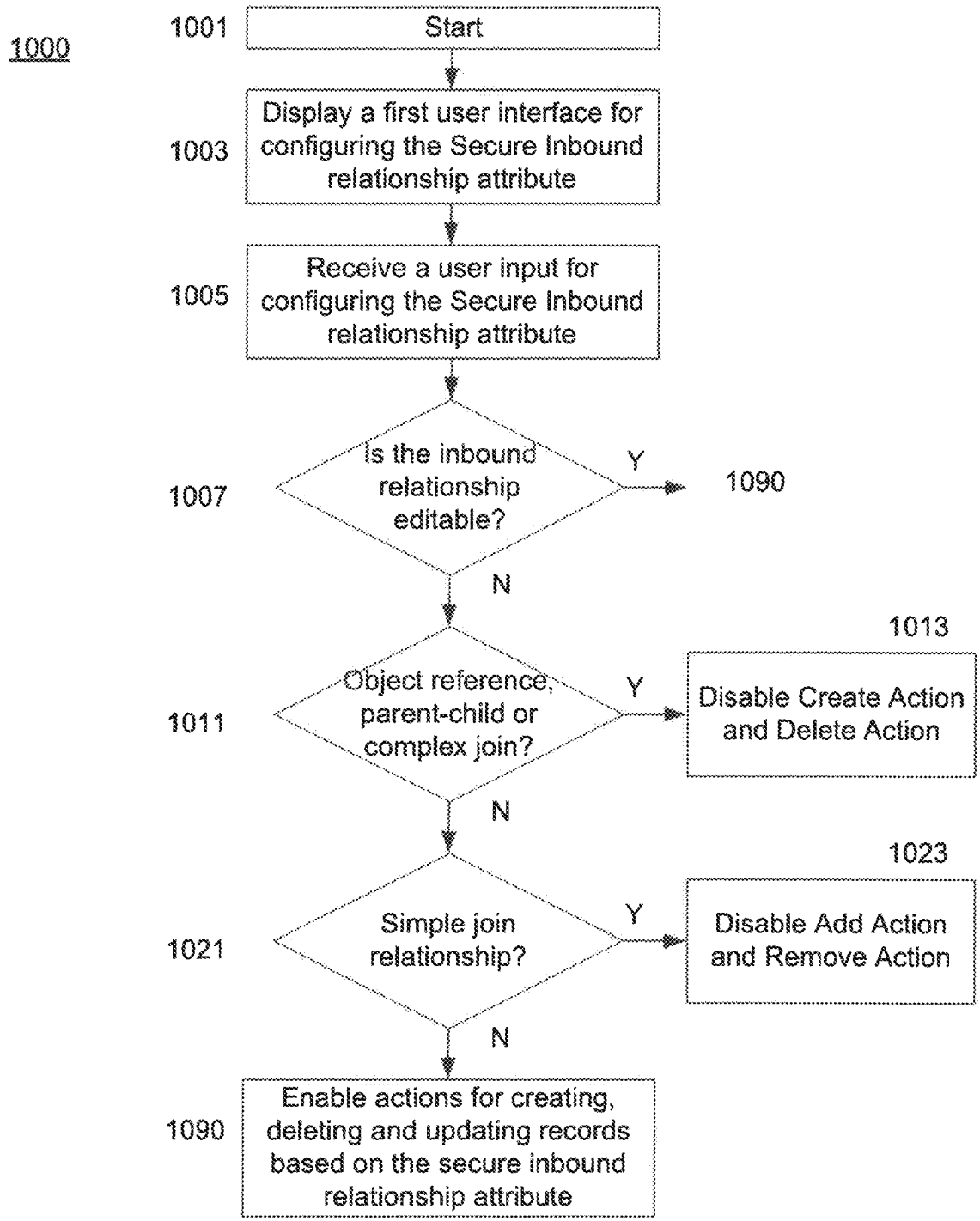
FIG. 10 illustrates a flowchart of a method for controlling relationship changes between records according to one embodiment of the present invention.

FIG. 10 illustrates a flowchart of a method for controlling relationship changes between records according to one embodiment of the present invention. The process may start at 1001.

A new attribute "Secure Inbound Relationship" may be introduced on object reference and parent object reference fields. At 1003, a user interface may be displayed to allow users to configure the secure inbound relationship attribute. FIG. 11 illustrates an example user interface 1100 for configuring the secure inbound relationship attribute according to one embodiment of the present invention.

In one implementation, by default, the "secure inbound relationship" attribute is unset (unchecked) when a new object reference field (object or parent object) is created. This field is enabled and editable when the object reference field is selected or when the object reference or parent object has a lifecycle assigned to it. This attribute may be exposed on object reference or parent object reference field type, and may be enabled when the referred object has a lifecycle. The attribute (checkbox) is disabled when there is no lifecycle assigned to the referenced/parent object. A user having Edit access to the document field configuration needs to explicitly set this flag in the user interface (default is unselected when the object reference field is created).

In one implementation, a new feature flag "Secure Inbound Relationship" may be used to control if the "Secure Inbound Relationship" flag is exposed and can be turned on for object relationships. A flag in the user interface (default is unselected when the object field is created) may be set by a user having Edit access to the object configuration pages.

Figure 12:
FIG. 12 illustrates an example user interface for configuring secure inbound relationship attribute according to one embodiment of the present invention.

At 1005, a user input for turning on this attribute may be received. FIG. 12 illustrates an example user interface for configuring secure inbound relationship attribute according to one embodiment of the present invention. As shown, the secure inbound relationship attribute is turned on. Once this attribute is turned on, the inbound relationship is available for configuration on the Object Lifecycle State Details page.

In one implementation, internal APIs may allow checking of the security configuration of inbound relationships (Object to Objects, Object to Documents). Based on the context (user ID, master record ID State and assigned Roles), the internal APIs may return which inbound relationships are editable and which are read-only at 1007.

In one example, a Complaint object record in state "In Investigation" has related Investigation object records. The system may be configured in such a way that in the "in investigation" state, the complaint-investigation object relationship has an Edit permission for a user in the "Quality analyst" role on the Complaint record, and has a Read permission for users in any other role on the record (default state behavior). In this case, a user in a "Consumer" role may be able to view the complaint and investigations, but will not be able to assign new investigation record on the complaint or delete existing investigation records for the complaint. Conversely, a user in a "Quality Analyst" role on the complaint will be able to assign new investigation records on the Complaint or delete existing investigation records assigned to the Complaint.

When the relationship between the master and detail objects is secured, the state and roles applied on the master object records drive behaviors of related objects on the object details page of a master object. If the inbound relationship is editable, the process may proceed to 1090 where actions for Creating, Deleting, and Updating records should honor secured inbound relationship(s) and be enabled.

Otherwise, at 1011, it may be determined if the relationship between the objects is object reference, parent-child, or complex join. If yes, the Create action and Delete action may be disabled at 1013.

Figure 13:
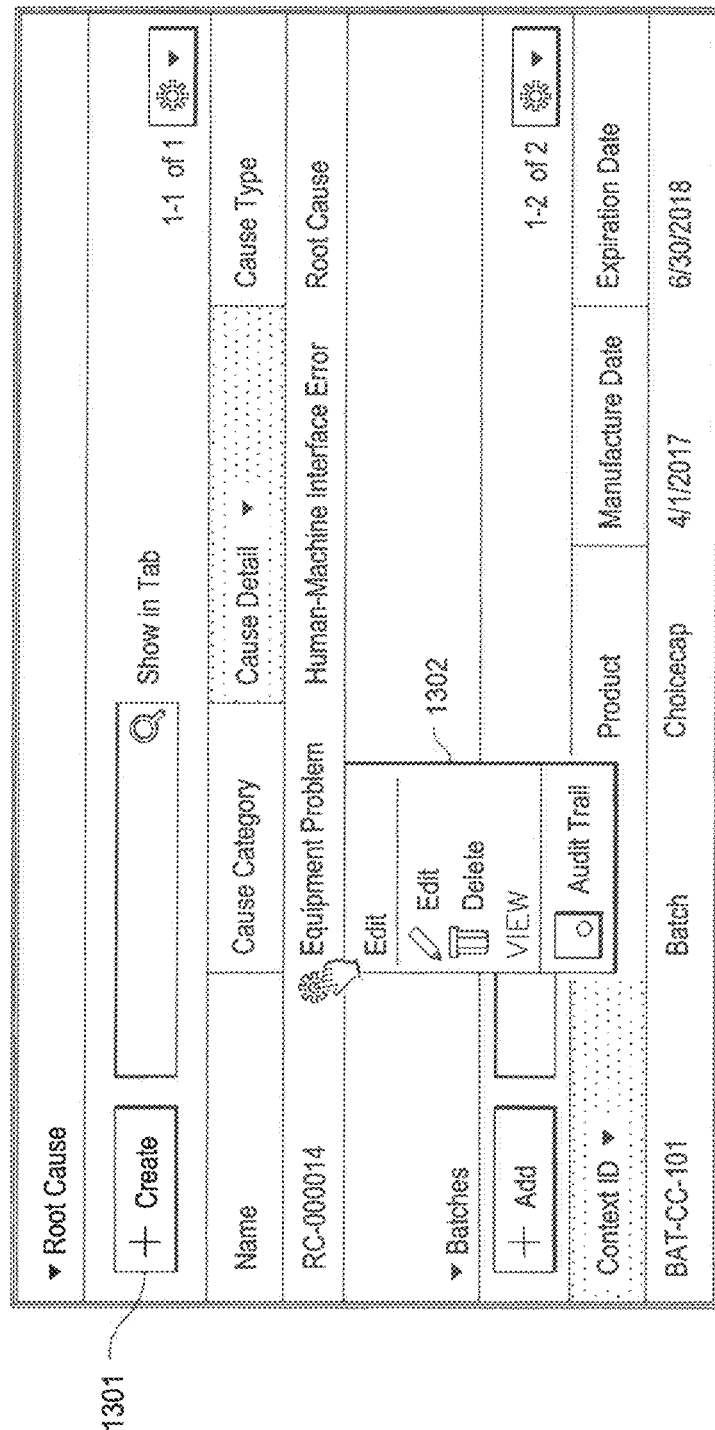
FIG. 13 illustrates an example user interface for permitted actions based on the secure inbound relationship attribute according to one embodiment of the present invention.

In an implementation shown in FIG. 13, a "Create" button 1301 is displayed (or not) on related Object sections based on relationship security. For example, if the relationship has only a Read permission based on the record state and role applied on the record, the Create button 1301 is not displayed.

A "Delete" action 1302 is available or not based on relationship security. If the relationship has only a Read permission, the "Delete" button 1302 is not available either.

At 1021, it may be determined if the relationship between the objects is the simple join relationship. If yes, the Add action and Remove action may be disabled at 1023.

As shown in FIG. 14, neither "Add" button 1401 nor "Remove" action 1402 is available if the relationship has a Read permission.

If the inbound relationship is editable, at 1090, actions for Creating, Deleting, and Updating records should honor secured inbound relationship(s) and be enabled.

In all object relationships, when a related object is displayed, e.g., on a Custom Tab or in Business Admin, the "Create" action button is displayed based on the Create permission (Profile level permission).

Figure 15A:
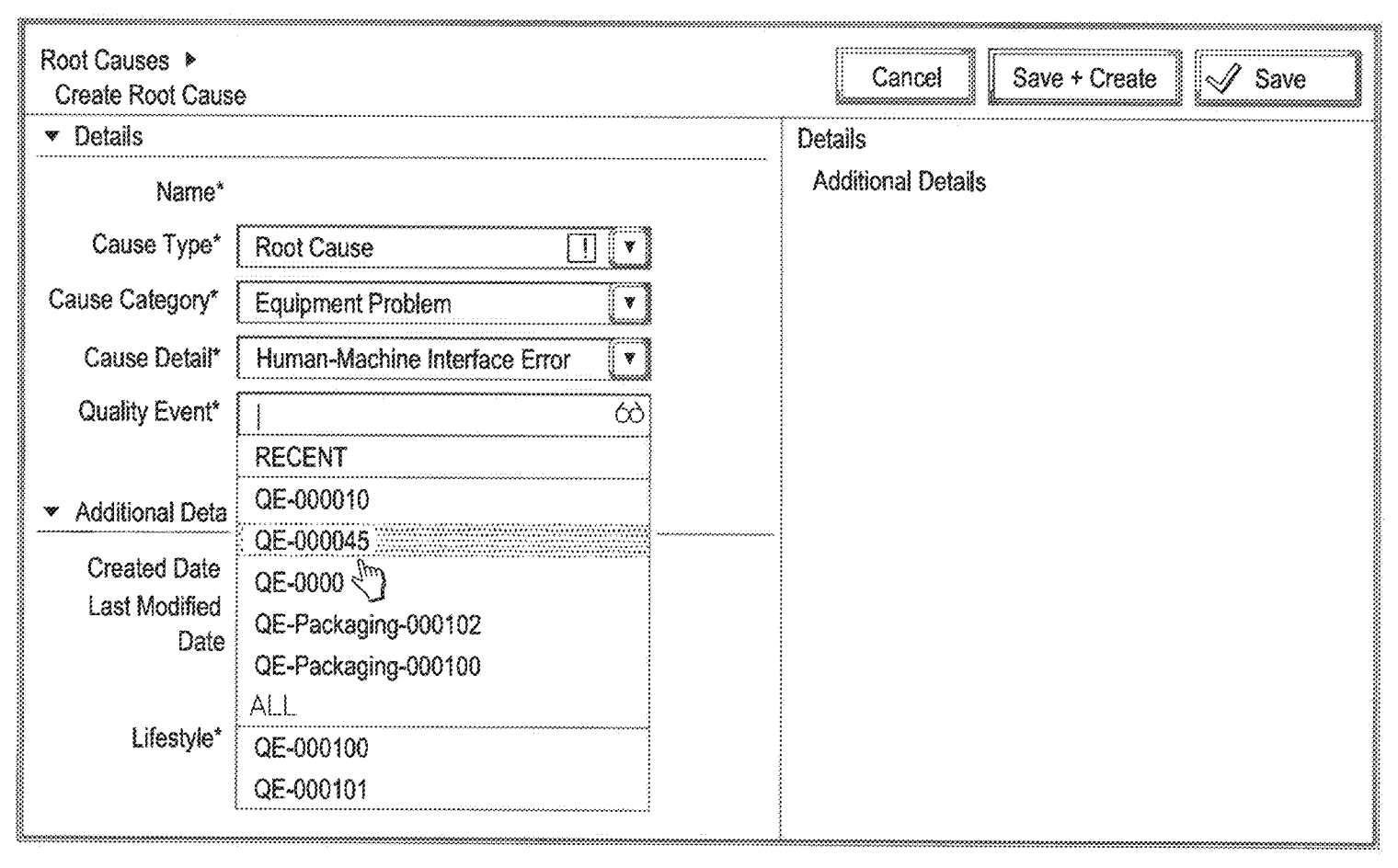

When creating a new record, it is checked on Save if the record can be saved based on the Create permission. A new record cannot be created if at least one object reference refers to a record where the relationship has a Read permission only, and the user may be informed accordingly. In an example shown in FIGS. 15A and FIG. 15B, if the selected Quality Event is in a State and role that have the relationship with a Read permission (relationship between Quality event and Root Cause), an inline message error may be displayed on Save on each object reference field failing validation. The inline message may be, for example: "You do not have permission to select this value."

In one implementation, when editing an object, the object may have one or more object references secured by an inbound relationship. When the object reference field is already populated:

(1) If the inbound relationship of the referenced object record has a Read permission (Quality Event-Root cause relationship, for example), based on state and user role, the object reference field (Quality event) is read-only.

(2) If the inbound relationship of the referenced object record has an Edit permission, based on state and user role, the object reference field can be updated. A validation is done on save to check that the newly selected record can be assigned to the detail records, based on inbound relationship security (same logic as that described above regarding the Create action).

When the object reference field is not populated (assuming the object reference field is not mandatory and/or editable), the object reference field can be updated. A validation is done on save to check that the newly selected record can be assigned to the detail records, based on inbound relationship security (same logic as that described above regarding the Edit action).

In one implementation, if the object record has at least one object reference having an inbound relationship disable, the "Delete" action is not available, as shown in FIG. 16.

Delete record-level action should be prevented on the object reference if the corresponding inbound relationship on the object has a Read permission only.

In one implementation, re-assignment is possible for object references. List view on an object with one or more object references should honor secured inbound relationship. In-line edit should to be prevented on the object reference if the corresponding inbound relationship on the object has a Read permission only. For instance, in the example in FIG. 16, a root cause has an inbound relationship (object reference) with a Read permission for the state/role on the Quality Event record. In this case, the object reference field should be read-only.

If the field is editable, relationship security should be honored. An inline error message may be displayed if an invalid value with in-line edit is selected:

"You do not have permission to select this value."

In one implementation, when an object has an inbound document relationship, it is possible to expose the related documents in the object details layout. As shown in FIG. 17, the "Add" button (1) on the related document component should honor inbound relationship security in a way similar to objects. When the inbound relationship has only a Read permission, the "Add" button is not displayed.

Requirements described above apply to the "generic" related document component. The same requirements should be enforced for the 'Documents to be Released' and 'Documents to be made obsolete' components displayed on the change control details page.

As shown in FIG. 18, the "Add" button (1) on the related document component and the "Remove" icon on the related document component should honor inbound relationship security (in a way similar to objects). When the inbound relationship has only a Read permission, the "Add" button and "Remove" icon are not displayed/not available.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for controlling relationship changes between records in a content management system, wherein the content management system stores a first record and a second record and wherein each of the records is associated with a set of attributes, the method comprising:

displaying a first user interface;

receiving on the first user interface a first set of access control configuration information for a first user based on a first layer of access control of the content management system, wherein the first set of access control configuration information comprises a first type of access permission;

displaying a second user interface;

receiving on the second user interface a second set of access control configuration information for the first user based on a second layer of access control of the content management system, wherein the second set of access control configuration information comprises a second type of access permission;

displaying a third user interface;

receiving secure inbound relationship configuration information on the third user interface, wherein the secure inbound relationship configuration information comprises a secure inbound relationship attribute, wherein when a secure inbound relationship flag of the secure inbound relationship attribute is enabled, a relationship security can be configured, at least, by a life cycle state of a master object;

wherein the first record is a master record and the second record is a detail record, wherein the second record references the first record, wherein the first record and the second record have a pre-determined record-to-record relationship, and wherein the pre-determined record-to-record relationship is secured when the secure inbound relationship attribute is turned on, wherein a master object reference field comprises a master object secure inbound relationship attribute which can be configurable by user inputs;

determining if the inbound relationship is editable according to the secure inbound relationship attribute, the first record's condition, and the first type of access permission.

2. The method of claim 1, wherein the first record's condition comprises the first record's lifecycle state.

3. The method of claim 1, wherein the first record's condition comprises a user role assigned to the first record.

4. The method of claim 1, wherein the first record's condition comprises the pre-determined record-to-record relationship between the first record and the second record.

5. The method of claim 4, wherein the pre-determined record-to-record relationship is a simple join relationship.

6. The method of claim 4, wherein the pre-determined record-to-record relationship is a complex join relationship.

7. The method of claim 4, wherein the pre-determined record-to-record relationship is parent-child.

8. The method of claim 4, wherein the pre-determined record-to-record relationship is object reference.

9. The method of claim 1, wherein the second record references the first record in an object reference field.

10. The method of claim 1, further comprising enabling a secure inbound relationship flag.

11. The method of claim 1, further comprising: disabling an action for creating, deleting or updating a record on a user interface when the inbound relationship is read only.

12. The method of claim 1, further comprising: enabling an action for creating, deleting or updating a record on a user interface when the inbound relationship is editable.

13. The method of claim 1, further comprising: checking if the inbound relationship is editable before saving a change to a record.

14. The method of claim 13, further comprising: displaying a message indicating that the change to the record can't be saved when the inbound relationship is not editable.

15. The method of claim 1, further comprising:
receiving a third set of access control configuration information for the first user based on the second layer of access control of the content management system, wherein the third set of access control configuration information overrides the second set of access control configuration information and comprises a third type of access permission; and determining the first user's right to access based on the first set of access control configuration information and the third set of access control configuration information.

16. A system for controlling relationship changes between records in a content management system, wherein the content management system stores a first record and a second record and wherein each of the records is associated with a set of attributes, the system comprising an access controller for:

displaying a first user interface;

receiving on the first user interface a first set of access control configuration information for a first user based on a first layer of access control of the content management system, wherein the first set of access control configuration information comprises a first type of access permission;

displaying a second user interface;

receiving on the second user interface a second set of access control configuration information for the first user based on a second layer of access control of the content management system, wherein the second set of access control configuration information comprises a second type of access permission;

displaying a third user interface;

receiving secure inbound relationship configuration information on the third user interface, wherein the secure inbound relationship configuration information comprises a secure inbound relationship attribute, wherein when a secure inbound relationship flag of the secure inbound relationship attribute in enabled, a relationship security can be configured, at least, by a life cycle state of a master object;

wherein the first record is a master record and the second record is a detail record, wherein the second record references the first record, wherein the first record and the second record have a pre-determined record-to-record relationship, and wherein the pre-determined record-to-record relationship is secured when the secure inbound relationship attribute is turned on, wherein a master object reference field comprises a master object secure inbound relationship attribute which can be configurable by user inputs;

determining if the inbound relationship is editable according to the secure inbound relationship attribute, the first record's condition, and the first type of access permission.

* * * * *